United States Patent
Murdin et al.

(10) Patent No.: US 7,400,695 B2
(45) Date of Patent: Jul. 15, 2008

(54) SYSTEM AND METHOD FOR TIME-MARKING DATA

(75) Inventors: Daniel Murdin, Linköping (SE); Predrag Pucar, Ljungsbro (SE); Franz Hofmann, Sturefors (SE)

(73) Assignee: Saab AB, Linköping (SE)

( * ) Notice: Subject to any disclaimer, the term of this patent is extended or adjusted under 35 U.S.C. 154(b) by 439 days.

(21) Appl. No.: 10/474,951

(22) PCT Filed: Apr. 8, 2002

(86) PCT No.: PCT/SE02/00691

§ 371 (c)(1),
(2), (4) Date: Apr. 7, 2004

(87) PCT Pub. No.: WO02/084463

PCT Pub. Date: Oct. 24, 2002

(65) Prior Publication Data

US 2004/0190664 A1 Sep. 30, 2004

(30) Foreign Application Priority Data

Apr. 18, 2001 (SE) .................................. 0101372

(51) Int. Cl.
*H04J 3/06* (2006.01)
(52) U.S. Cl. .................. 375/354; 370/252; 713/178
(58) Field of Classification Search ............... 375/354, 375/355; 370/252; 713/178, 176; 702/187; 710/58, 61
See application file for complete search history.

(56) References Cited

U.S. PATENT DOCUMENTS

| | | | | |
|---|---|---|---|---|
| 5,428,645 A | * | 6/1995 | Dolev et al. ................. | 375/354 |
| 5,790,543 A | * | 8/1998 | Cloutier ...................... | 370/252 |
| 7,058,020 B2 | * | 6/2006 | Tavana et al. ................ | 370/252 |
| 2001/0022823 A1 | * | 9/2001 | Renaud ....................... | 375/359 |
| 2002/0009168 A1 | * | 1/2002 | Dick et al. ................... | 375/356 |

FOREIGN PATENT DOCUMENTS

| | | |
|---|---|---|
| EP | 0379278 | 7/1990 |
| EP | 0458623 | 11/1991 |
| WO | 98/52122 | 11/1998 |
| WO | 01/97092 | 12/2001 |

* cited by examiner

*Primary Examiner*—Chieh M. Fan
*Assistant Examiner*—Aristocratis Fotakis
(74) *Attorney, Agent, or Firm*—Venable LLP; Eric J. Franklin

(57) ABSTRACT

This invention concerns a system comprising processors (2, 3) arranged so as to receive and process data arriving at the system and containing time-indicating means (11, 17, 21) operatively connected to said processors and arranged so as to furnish time data to the processors for time-marking of the data. The time-indicating means (11, 17, 21) include a hardware clock arranged so as to generate a clock signal, and further arranged so as to receive second time data from at least one additional time reference and modify the clock signal from the hardware clock using the second time data in order to generate the first time data. The time-indicating means (11, 17, 21) are arranged so as to add to the clock signal, during the generation of the first time data, a compensation signal ($\delta\tau_i$) based on said second time data. The invention also concerns a method for time-marking data.

12 Claims, 2 Drawing Sheets

SYSTEM AND METHOD FOR TIME-MARKING DATA

TECHNICAL AREA

This invention concerns a system according to the preamble to claim 1.

The invention also concerns a method according to the preamble to claim 9.

STATE OF THE ART

In a system comprising a plurality of processors in which data from a plurality of transmitters are weighed together, time-marking of the transmitter data is often performed in order to specify when in time the measured values were valid. The transmitter data arrive in the system via a data bus that is connected to all the transmitters. The data received in the system are time-marked by a receiving processor with times provided by a system clock that is readable by all the processors in the system. The clock is reset based on time data obtained from external time references in order to improve the accuracy of the system-clock time indications.

DESCRIPTION OF THE INVENTION

One object of the present invention is to eliminate the need for performing major resetting of the system clock using the external time references.

This has been achieved according to one embodiment of the invention by means of a system comprising a minimum of one processor arranged so as to receive and process data arriving at the system and containing time-indicating means operatively connected to said minimum of one processor and arranged so as to furnish first time data to the processors for time-marking of the data. The time-indicating means comprise a hardware clock arranged so as to generate a clock signal, and are also arranged so as to receive second time data from at least one additional time reference, and so as to modify the clock signal from the hardware clock using the second time data in order to create the first time data. The system is characterized in that the time-indicating means are arranged so as to add to the clock signal, during the generation of the first time data, a compensation signal ($\Delta_{\tau i}$) based on said second time data. The second time data characteristically have a frequency that is lower than that of the incoming data, while the frequency of the clock signal is of at least the same order of magnitude as the incoming data, whereupon the time marking is imparted with the resolution of the clock signal.

After a period of time, the compensation signal ($\Delta_{\tau i}$) being used becomes invalid and must be replaced with a new compensation signal ($\Delta_{\tau i+1}$) in order for the time-indicating means to be able to furnish accurate time data. In order to avoid the uncontrolled coexistence within the system of data that are time-marked with different compensation signals, the system contains comparing means arranged so as to generate a difference signal between the first and second time data, plus means arranged so as to generate a new version (i+1) of the compensation signal ($\Delta_{\tau i+1}$) when the difference signal exceeds a predetermined value, and to record the new compensation signal ($\Delta_{\tau i+1}$) together with an associated identifier ($I_{i+1}$). The time-indicating means are then arranged so as to use the current compensation signal value ($\Delta_{\tau i+1}$) in connection with the generation of the first time data. In connection with the time-marking of data, the associated identifier ($I_{i+1}$) is linked to the first time data, whereupon the data is marked with both a time tag and a version tag.

In an advantageous embodiment in a case where the system comprises two or more processors, the comparing means and the recording means are realized in a selected processor. This processor then comprises means for distributing the new compensation signal ($\Delta_{\tau i+1}$) and associated identity ($I_{i+1}$) to other processors upon each version change (i, i+1). Furthermore, in this embodiment, each processor should have means for storing the associated compensation signal ($\Delta_{\tau i+1}$) and associated identity ($I_{i+1}$) for each version (i+1).

In a case where the clock signal tends to drift relative to the second time data, the system can include filtering means arranged so as to receive as input the hardware clock signal and generate as output an calculated clock signal that is substantially synchronous with the second time data, plus means for resetting the hardware clock based on the output signal from the filtering means.

The filtering means can include, for example, a Kalman filter whose internal parameter settings are dependent upon an active time reference.

The system processors are preferably arranged so as to, in connection with calculations utilizing data specified in different time bases, retrieve information about the time differences between these time bases and also, in one particular embodiment, arranged so as to time-mark the calculated data in a selected time base.

According to another embodiment of the invention, a method is provided to time-mark data. The method involves time-marking data with first time data based on a clock signal from a hardware clock and is characterized in that second time data from at least one additional time reference are recorded, and in that a compensation signal ($\Delta_{\tau i}$) is generated based on said second time data, and that the compensation signal is added to the clock signal to generate said first time data.

EMBODIMENTS

Figure 1:
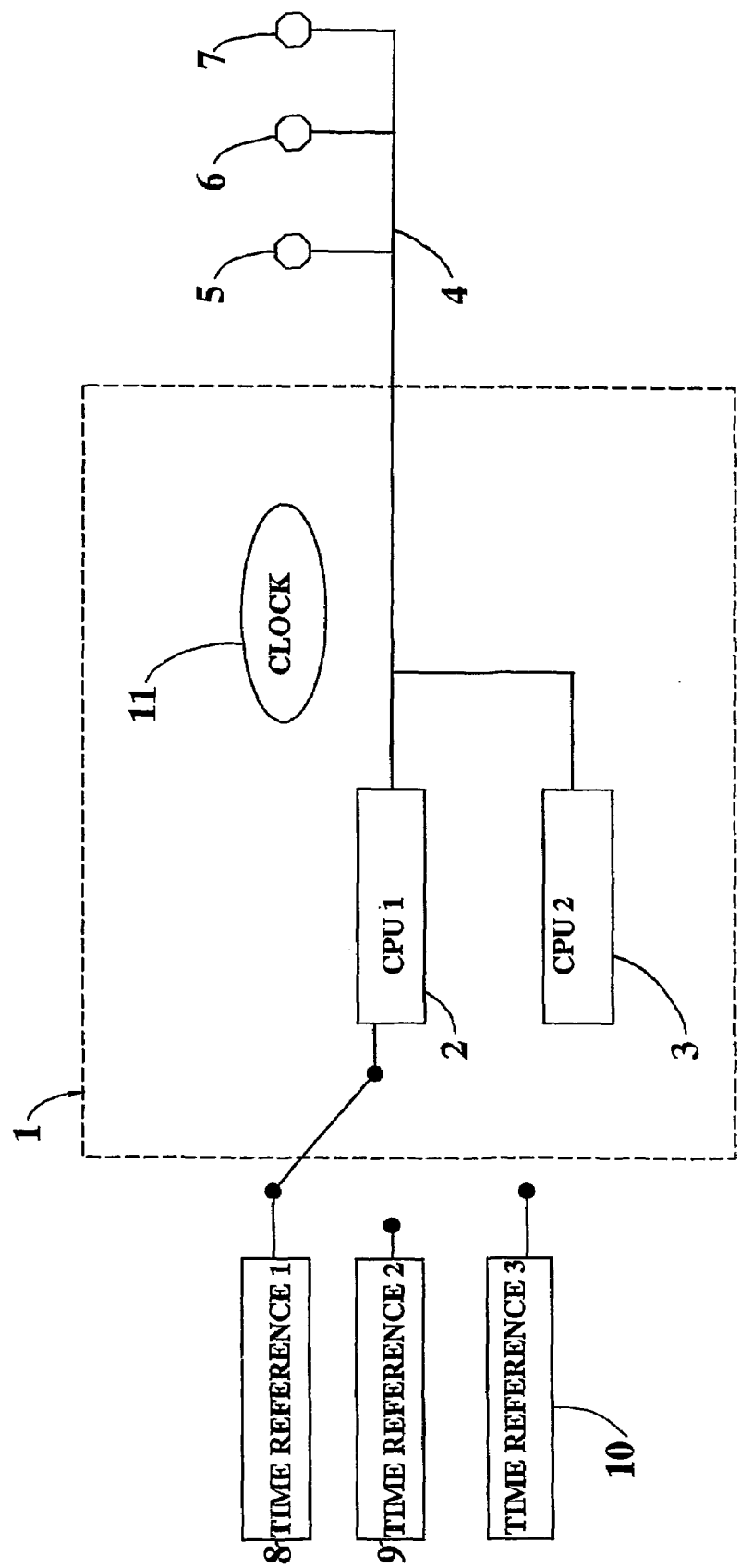
FIG. 1 shows a schematic diagram of an exemplary system according to the invention.

In FIG. 1, a distributed system 1 comprises a number of processors 2, 3 that are connected to one another. Data arrive at the system via a data bus 4 that is connected to outside units. In the figure, these outside units are transmitters 5, 6, 7. The processors 2, 3 are arranged so as to receive and process transmitter data arriving at the system via the data bus 4.

In one example, the system 1 is present in the navigation system of a vessel, and the transmitters consist of position-sensing transmitters deployed along the vessel. In a case where the vessel is moving at high speed, a time error will be converted directly into a positional error. It is thus important to determine when in time data are entering the system 1 via the data bus. The system 1 comprises a hardware clock 11 arranged so as to generate a clock signal whose frequency is of at least the same order of magnitude as that of the incoming data. The clock signal from the hardware clock can thus be used to time-mark data entering the system, and for time-marking calculated data. A broad range of oscillators intended to function as hardware clocks 11 and that give the time with varying degrees of accuracy is currently available. However, high-frequency oscillators that also accurately give the time in seconds, minutes and hours are extremely expensive.

The system 1 also has access to a plurality of time references 8, 9, 10 that alternate in an unpredictable way, but preferably in such a way that at least one of the time references is always active. These time references are characterized in that, when active, they produce time data at a frequency that is lower than the frequency of the hardware clock and the frequency of the incoming data via the data bus 4, and in that the time data from the time references are furnished with great accuracy. In one embodiment, the time data for at least one of the time references are obtained via GPS. GPS delivers time data of great accuracy, but only once per second. As noted above, it is critical in certain applications that the time-marking information used to time-mark the data be furnished with accuracy. To obtain time-marking information of such accuracy, time data from the time references 8, 9, 10 are used to correct the clock signal from the hardware clock 11. In the embodiment shown in FIG. 1, only one of the time references is active at any given time. The active time reference furnishes time data to the processor 2. However, the invention is not limited to this embodiment. In an alternative embodiment (not shown), one of the time references is obtained via the data bus, a second directly in processor 2 and a third directly in processor 3, and multiple time references can thus be active simultaneously in such an embodiment.

Figure 2:
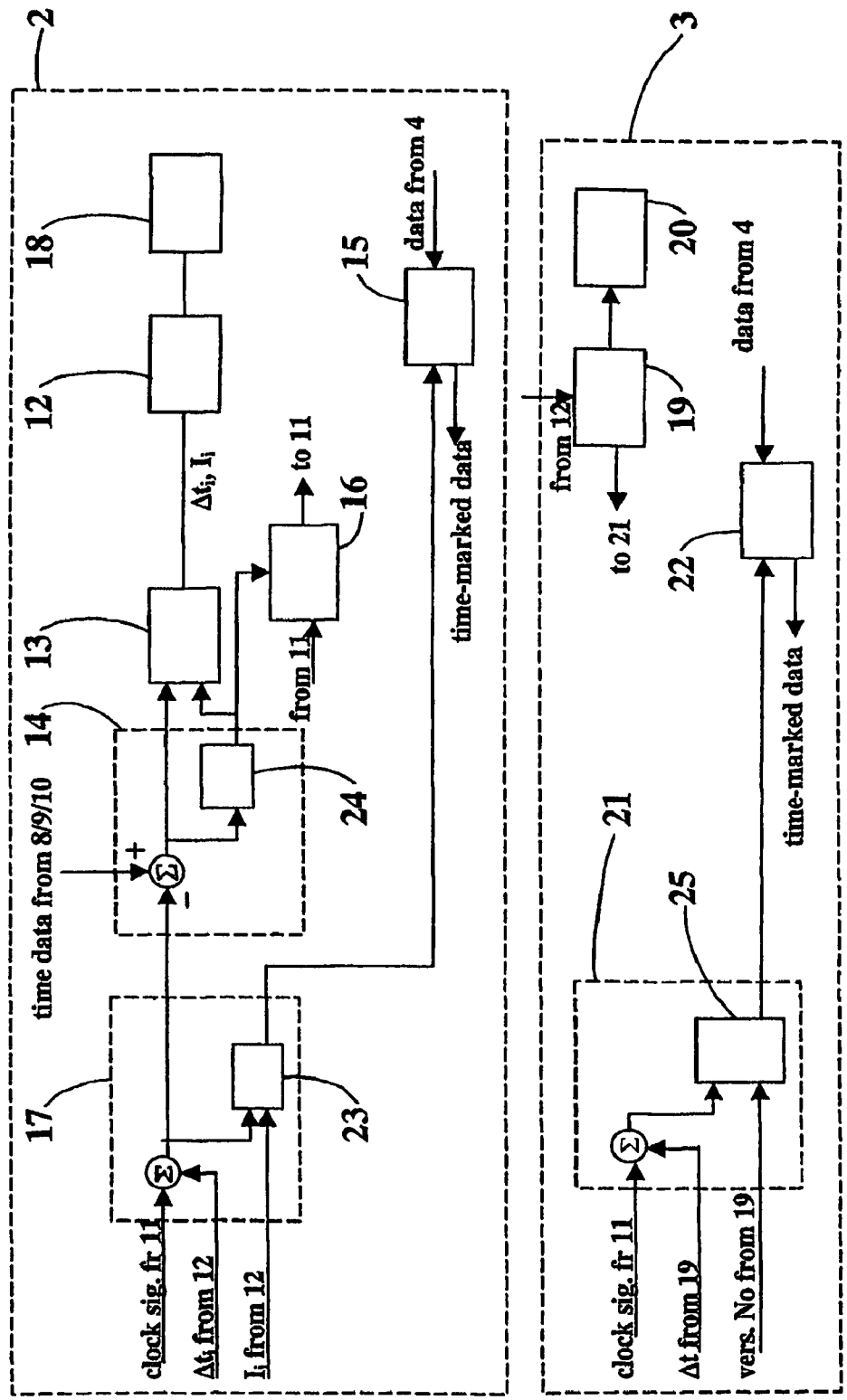
FIG. 2 shows a block diagram of how the processors in the system in FIG. 1 are intended to function.

In FIG. 2, the processor 2 is intended to furnish information for time-marking data that arrive at the system via the data bus 4 and are received by any of the processors 2, 3. For this purpose the processors 2, 3 are arranged so as to execute software instructions implemented in such a way that the processors function in accordance with a scheme as described below. The detailed design of software modules to control the processors 2, 3 so that they function in accordance with said scheme will be familiar to one skilled in the art, and need not be described here.

In FIG. 2, the data that are fed to any of the processors 2, 3 are received by a marking handler 15, 22 belonging to the respective processors 2, 3. These marking handlers 15, 22 are of identical design. The marking handler 15 in the processor 2 is connected to an associated software clock 17, while the marking handler 22 in the processor 3 is connected to an associated software clock 21. Each of the software clocks 17, 21 delivers a continuous composite time-marking tag, which will be described in detail below. In the respective marking handlers 15, 22, the received data from the data bus 4 are linked to the relevant time-marking tag from the associated software clock 17, 21. The thus time-marked data are then output from the marking handlers 15, 22 for further processing in the processors 2, 3.

The composite time-marking tag created in the software clocks 17, 21 includes time-indicating data. In the processor 2 the time-indicating data from the software clock 17 are fed continuously to a comparing unit 14. In the comparing unit a difference signal is generated between the time-indicating data and the time data from the currently active time reference 8. The comparing unit 14 also includes a comparator 24 that receives the difference signal, compares the absolute value of the difference signal to a predetermined value and outputs a marking signal that indicates whether or not the predetermined value has been exceeded.

A version handler 13 is arranged so as to receive from the comparing unit 14 both the difference signal and the marking signal from the comparator 24. The version handler 13 is blocked as long as the marking signal indicates that the predetermined value has not been exceeded. However, when the marking signal indicates that the predetermined value has been exceeded, the version handler 13 is activated, whereupon the version handler generates a compensation value $\Delta_{\tau i}$, and enters it into a database 12 along with a unique identity $I_i$.

In a simple embodiment the version handler includes a counter (not shown) arranged so as to count one increment upward each time the marking signal indicates that the predetermined value has been exceeded, thus providing the unique identify $I_i$ by simple means in the form of a version number.

The compensation value $\Delta_{\tau i}$ is generated by adding the difference signal from the comparing unit 14 to the preceding compensation value $\Delta_{\tau i-1}$ stored in the database. The software clock 17 has an operative connection with the database 12 and continuously retrieves thence the current version number $I_i$ and its associated compensation value $\Delta_\tau$. The software clock 17 also receives the clock signal from the hardware clock 11. The aforementioned time-indicating data from the software clock are generated therein by adding $\Delta_\tau$ to the clock signal. A combining unit 23 incorporated in the software clock continuously combines the time-indicating data and the current version number from the database 12 to produce the time-marking tag, which is fed to the marking handler 15.

The database 12 is connected to a second database 19 in the processor 3, and is arranged so as to update the content of the database 19 based on the content of the database 12. The software clock 21 has an operative connection with the database 19, and retrieves thence current compensation values $\Delta_\tau$ and associated version numbers. The software clock also receives the clock signal from the hardware clock 11. The time-indicating data fed to the marking handler 22 are generated in the software clock 21 by adding $\Delta_\tau$ to the clock signal. A combining unit 25 incorporated in, the software clock continuously combines the time-indicating data and the current version number from the database 19 to generate the time-marking tag for the marking handler 22. One point here is that the database 19 can be updated asynchronously using the database 12, i.e. with a certain delay relative to the database 12, without affecting the functionality, as long as no data are time-marked using the outdated version, $I_{i-1}$.

It is very expensive to produce oscillators 11 that operate at high frequency and simultaneously deliver extremely high accuracy for longer time increments. As a result, a somewhat unstable oscillator is found in most applications, and the signal produced will tend to drift in one direction or another relative to the time data from the time references. The time references are characteristically updated at a significantly lower frequency than the clock signal, and will thus in most likely indicate the time with greater accuracy. The degree of error in the time-indicating data that can be tolerated is of course determined by the application for which the system 1 is intended to be used. In order to compensate in the most practical manner for the fact that the clock signal from the oscillator 11 will drift relative to the time data from the time reference, the clock signal from the system clock 11 is fed to a filter 16, such as a Kalman filter, that is arranged to cope with the instability of the oscillator. The filter 16 also receives the marking signal from the comparator 24 and is arranged so that it will, as long said marking signal indicates that the difference signal from the comparing unit 14 is less than the predetermined value, output a modified clock signal. The internal parameter settings of the filter 16 are corrected based on an active time reference, and the active time reference also acts as the input to the filter 16 for updating its parameter settings. The modified clock signal from the filter 16 is used continuously to reset the system clock 11 as long as the difference between the input and output signals from the filter 16 is below a specific value that is characteristically lower than the predetermined value cited above in connection with the comparing unit 14; such a unit that executes the comparison between the input and output signals may consist of a comparator of conventional type, and is not shown in FIG. 2. When the time reference changes, the parameter settings for the deactivated time reference are saved in a memory (not shown) to be reused if the time reference in question should again become active. The filter 16 is reset using parameter settings for the time reference just activated. In a case where the activated time reference occurred earlier in the system, the filter 16 is reset using the parameter settings stored in the memory for that time reference. If the activated time reference has not occurred earlier in the system, then the filter 16 will be reset using standard parameter settings stored in the memory. The filter 16 is superfluous in a case involving a highly stable oscillator 11 where, although a time difference does exist between the clock signal and the respective time base, it will be substantially constant in time.

Note that resetting of the oscillator 11 is thus used only to cope with the instability of the oscillator, and that larger discrepancies, i.e. greater than the predetermined value cited in connection with the comparing unit 14, between the clock signal and the time data from the time references are handled by the software clock via version changes. The version change will thus occur as soon as the predetermined value is exceeded, regardless of whether the value is exceeded because of a change of time references or for some other reason.

As a result of this time-marking of the incoming data via the data bus 4, information as to when the data entered the system is always available for use in subsequent processing of the data in the processors 2, 3. In the event that calculations are to be performed on data marked with different versions, a unit 18, 20 is called that is, in the embodiment shown, realized in connection with its respective processor and arranged so as to retrieve information from its associated database 12, 19 concerning differences in the compensation values between the versions used in the calculations $\Delta_{\tau_i}$, this unit will report any such differences to the calling processor. In one example the processors 2, 3 are further arranged so as to time-mark the calculated data with the time-indication that was in effect when the values used in the calculation were valid, as indicated in the version current at the moment of calculation. If the programming language used to implement the system described herein permits, methods for handling operations involving data expressed in different versions may be predefined, whereupon the handling of different versions in the system will be entirely invisible to the programmer of the application software.

The invention claimed is:

1. A system for time marking data, comprising:
at least one processor configured to receive and process data arriving at the system,
time-indicating means operatively connected to said at least one processor and configured to furnish first time data to the at least one processor for time-marking of the data, the time-indicating means comprising a hardware clock configured to generate a clock signal, wherein the time-indicating means is configured to receive second time data from at least one additional time reference and modify the clock signal from the hardware clock using the second time data in order to generate the first time data, and wherein the time-indicating means is configured to add to the clock signal, during the generation of the first time data, a compensation signal based on said second time data;
comparing means configured to generate a difference signal between the first and second time data;
means configured to generate a new version of the compensation signal when the difference signal exceeds a predetermined value; and
recording means for recording the new version of the compensation signal together with an associated identifier of the version of the compensation signal,
wherein when the data is received the at least one processor time-marks the data with the clock signal, compensation signal and associated identifier of the version.

2. The system according to claim 1, wherein the time-indicating means utilizes a current compensation signal value when generating the first time data, and wherein in connection with time-marking, the associated identifier is linked to the first time data.

3. The system according to claim 1, wherein the system comprises at least two processors, wherein a first of the processors comprises the comparing means and the recording means, the first processor further comprising means for distributing the new version of the compensation signal and the associated identity to others of the at least two processors upon each version change.

4. The system according to claim 3, wherein each of the at least two processors comprises means for storing an associated compensation signal and associated identity for each version.

5. The system according to claim 1, further comprising:
filtering means configured to receive the hardware clock signal as input and generate as output a calculated clock signal that is substantially synchronous with the second time data; and
means for resetting the hardware clock using the output signal from the filtering means.

6. The system according to claim 5, wherein the filtering means comprises a Kalman filter comprising internal parameter settings dependent upon an active time reference.

7. The system according to claim 1, wherein the second time data have a frequency that is lower than a frequency of incoming data, and wherein a frequency of the clock signal is of at least a same order of magnitude as a frequency of the incoming data, whereupon the at least one processor further marks the data with a resolution of the clock signal.

8. The system according to claim 7, further comprising:
at least one marking handler configured to time-mark data received and/or calculated by one of the at least one processor associated with the at least one marking handler.

9. A method for time-marking data, comprising:
receiving the data with at least one processor;
generating a clock signal with a hardware clock included in time-indicating means; receiving second time data from at least one additional time reference with the time-indicating means;
modifying the clock signal using the second time data to generate first time data by adding to the clock signal a compensation signal based on the second time data;
comparing the first time data to the second time data;
generating a difference signal based on the comparison of the first time data and the second time data;
comparing the difference signal to a predetermined value;
generating a new version of the compensation signal when the difference signal exceeds the predetermined value;
recording the new version of the compensation signal with an associated identifier of the version of the compensation signal; and marking the data with the at least one processor with the clock signal, the compensation signal and the associated identifier of the compensation signal with the data is received.

10. The method according to claim 9, further comprising:
filtering the hardware clock signal to produce a calculated clock signal that is substantially synchronous with the second time data; and
resetting the hardware clock based on the calculated clock signal.

11. The method according to claim 9, wherein when performing calculations involving data expressed in different versions of the compensation signal, information concerning a time difference between the compensation signals for the different versions is utilized.

12. The method according to claim 11, wherein results of the calculations are time-marked in a selected version.

* * * * *